United States Patent [19]

Sa

[11] Patent Number: 5,701,805
[45] Date of Patent: Dec. 30, 1997

[54] STEAM PRESSURE RICE COOKER WITH AN AUXILIARY STEAM PRESSURE EXHAUSTING DEVICE

[75] Inventor: Yong-Jae Sa, Seoul, Rep. of Korea

[73] Assignee: Daewoo Electronics Co., Ltd., Rep. of Korea

[21] Appl. No.: 807,917

[22] Filed: Feb. 28, 1997

[30] Foreign Application Priority Data

Feb. 28, 1996 [KR] Rep. of Korea .................. 96-5146

[51] Int. Cl.$^6$ .................. A23L 1/00; A47J 27/00; F27D 11/02
[52] U.S. Cl. .................. 99/331; 99/333; 99/337; 99/403; 219/435; 219/441; 219/492; 219/494
[58] Field of Search .................. 99/330–333, 341, 99/342, 337, 338, 403, 410; 219/441, 442, 492, 494, 429–438; 220/316, 912, 325, 421; 426/508, 523

[56] References Cited

U.S. PATENT DOCUMENTS

| | | | |
|---|---|---|---|
| 4,307,287 | 12/1981 | Weiss | 219/442 |
| 4,313,051 | 1/1982 | Aoshima | 219/441 |
| 4,315,138 | 2/1982 | Miwa | 219/441 |
| 4,315,139 | 2/1982 | Onishi et al. | 99/333 X |
| 4,421,974 | 12/1983 | Oota et al. | 219/492 X |
| 4,441,016 | 4/1984 | Oota et al. | 219/494 X |
| 5,048,400 | 9/1991 | Ueda et al. | 99/331 X |
| 5,092,229 | 3/1992 | Chen | 99/337 |
| 5,265,522 | 11/1993 | Schultz | 99/342 |
| 5,317,959 | 6/1994 | Beluzzi | 99/337 |
| 5,370,259 | 12/1994 | Cartigny | 220/316 |
| 5,429,039 | 7/1995 | Chang | 99/331 |
| 5,632,403 | 5/1997 | Deng | 99/337 X |

*Primary Examiner*—Timothy F. Simone
*Attorney, Agent, or Firm*—Cushman Darby & Cushman Intellectual Property Group of Pillsbury Madison & Sutro, LLP

[57] ABSTRACT

Disclosed is a steam pressure rice cooker with an auxiliary steam pressure exhausting device capable of completely exhausting a high temperature and high pressure steam which remains inside the steam pressure rice cooker immediately after a cooking of rice to an outside of the steam pressure rice cooker. In the inside of a lid for opening or shutting an upper portion of a cylindrical inner frame containing a desired quantity of water and rice to be cooked, an auxiliary steam pressure exhausting device is disposed between a handle of the lid and a weight of the lid. An exhaust button of the auxiliary steam pressure exhausting device is slideably disposed in a first opening which is formed through a center of the handle. A supporting member for elastically supporting the exhaust button is disposed in the exhaust button. A pressing member extending from one side of the exhaust button in the horizontal direction presses down a compressible portion of a lever for forcibly opening the weight by receiving the driving force from the exhaust button. The lever is fixed to a side wall of the lid. The lever can rotate by a certain angle about a pivot which is disposed to a middle portion of the lever. A second extending portion of the lever tilts the weight during the rotation of the lever. The second extending portion is exposed to the outside of the steam pressure rice cooker through a second opening which is formed through an upper wall of the lid.

20 Claims, 7 Drawing Sheets

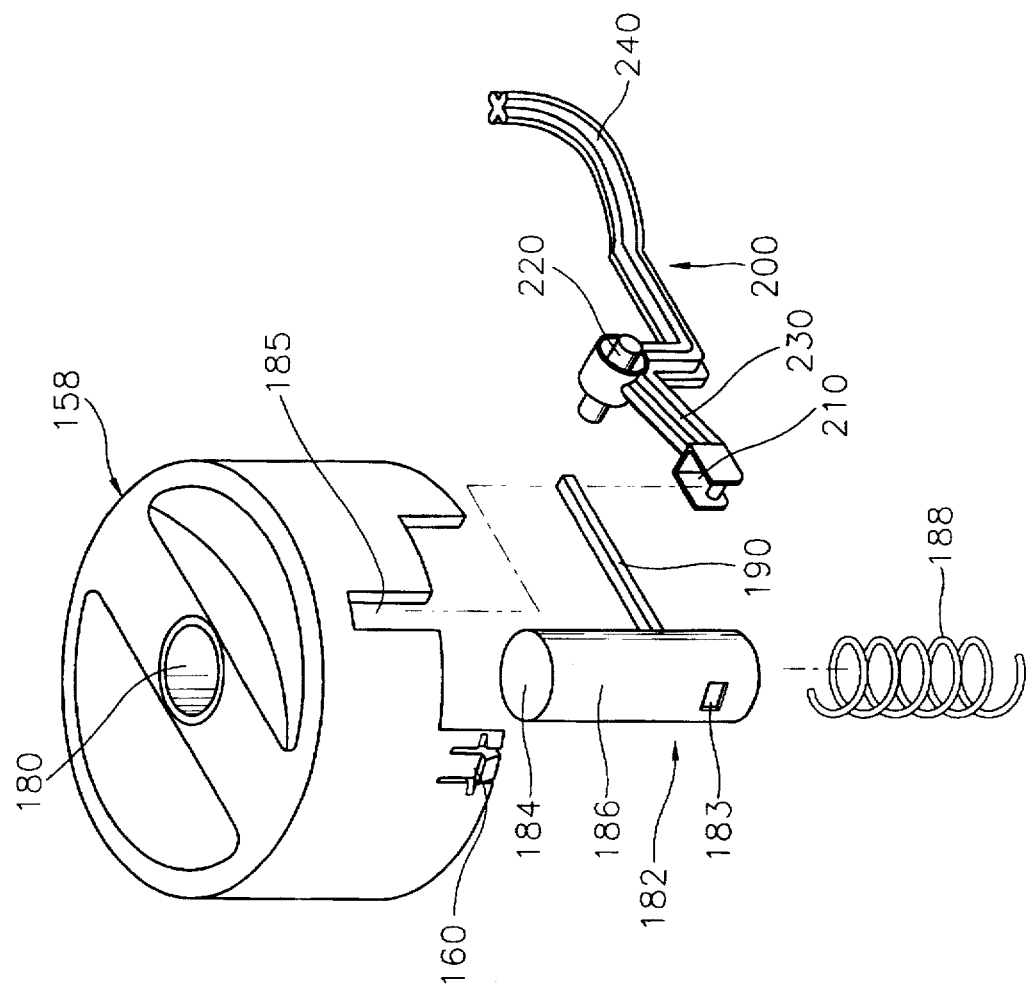

STEAM PRESSURE RICE COOKER WITH AN AUXILIARY STEAM PRESSURE EXHAUSTING DEVICE

BACKGROUND OF THE INVENTION

1. Field of the Invention

The present invention relates to a steam pressure rice cooker with an auxiliary steam pressure exhausting device, and more particularly to a steam pressure rice cooker with an auxiliary steam pressure exhausting device capable of completely exhausting a high temperature and high pressure steam remaining inside the steam pressure rice cooker to an outside after cooking a rice.

2. Description of the Prior Art

Generally, since a steam pressure rice cooker can boil a rice of excellent taste, it is widely used at home. FIG. 5 schematically shows an internal structure of an electric steam pressure rice cooker 10. Electric steam pressure rice cooker 10 mainly includes a cylindrical inner frame 20, a cylindrical outer frame 22, and a lid 50 for opening and closing an opening portion of cylindrical inner frame 20. Cylindrical inner frame 20 contains a desired quantity of water and rice to be cooked. Cylindrical outer frame 22 encloses and supports cylindrical inner frame 20.

A suitable space (S) is formed between an outer surface of a bottom of cylindrical inner frame 20 and cylindrical outer frame 22. An electric heater 30 for heating cylindrical inner frame 20 is located in the space (S). Electric heater 30 is installed in a gap at suitable distances from cylindrical inner frame 20 and cylindrical outer frame 22. A plurality of heat conductive plates 32 are disposed around electric heater 30. Heat conductive plates 32 are tightly mounted on an outer surface of cylindrical inner frame 20. Heat conductive plates 32 transfer a heat generated from electric heater 30 to cylindrical inner frame 20. A temperature sensor 34 is mounted on a central outer surface of a bottom of cylindrical inner frame 20.

On the other hand, a lid 50 for opening and shutting an opening of cylindrical inner frame 20 is rotatably mounted on an upper portion of cylindrical inner frame 20 by a hinge member 40. FIG. 6 illustrates an internal structure of lid 50 in detail. Referring to FIG. 6, a rotating plate 54 with a plurality of locking members 52 are provided at an inner side of a bottom of lid 50. A locking member 52 is tightly engaged with a flange 24 extending radially outward from an upper end of cylindrical inner frame 20. A cover 56 for covering an opening of cylindrical inner frame 20 is provide at a bottom side of rotating plate 54.

A handle 58 is mounted at a center of an upper portion of lid 50. A compression spring 59 is included therein at an inner side of a lower portion of handle 58. A locking groove 60 is formed at an inner side of a lower portion of handle 58. A driving gear 62, a plurality of first connecting gears 64, and second connecting gears 66 are successively disposed in an inner side of lid 50. Driving gear 62 includes a locking protrusion 63 which is formed at an end of driving gear 62. Locking protrusion 63 corresponds with locking groove 60. Locking protrusion 63 is inserted into locking groove 60 when handle 58 descends. Driving gear 62, first connecting gears 64, and second connecting gear 66 are sequentially engaged with one another. Handle 58 can be mechanically connected to rotating plate 54 through driving gear 62, first connecting gears 64, and second connecting gear 66.

A weight 70 is mounted at an upper portion of lid 50. An exhaust pipe 72 vertically extends between weight 70 and cylindrical inner frame 20. Weight 70 is mechanically connected to cylindrical inner frame 20 through exhaust pipe 72. Weight 70 exhusts a high temperature and high pressure steam generated inside cylindrical inner frame 20 to an outside of electric team pressure rice cooker 10 during an operation of electric steam pressure rice cooker 10.

Hereinafter, an operation of conventional electric steam pressure rice cooker 10 constructed as above will be described.

In general, when a user of electric steam pressure rice cooker 10 wants a boil a rice, the user places the rice to be cooked and a desired quantity of water into cylindrical inner frame 20. Thereafter, the user closes an opening of cylindrical inner frame 20 by the shutting of lid 50. Under this state, when the user presses down and rotates handle 58 in the clockwise direction, handle 58 gradually descends. As a result, locking protrusion 63 of driving gear 62 is inserted into locking groove 60 of handle 58, thereby driving gear 62 can be driven. Accordingly, first connecting gears 64 and second connecting gear 66 are rotated and the rotation thereof controls a rotation of rotating plate 54. When rotating plate 54 is rotated, locking member 52 of rotating plate 54 is tightly engaged with flange 24 of cylindrical inner frame 20. Thereby, cover 56 of lid 50 tightly closes the opening of cylindrical inner frame 20.

When the user of electric steam pressure rice cooker 10 operates electric steam pressure rice cooker 10 under the state that the user completely rotates handle 58 in the clockwise direction to perfectly close cover 56, electrical heater 30 begins to operate and heats cylindrical inner frame 20. At this time, a high temperature heat generated from electric heater 30 is uniformly transferred to an outer surface of cylindrical inner frame 20 through heat conductive plates 32. Thereby, a rice cooking process is started. On the other hand, if a steam generated inside cylindrical inner frame 20 has a steam pressure value grater than a predetermined steam pressure value during the rice cooking process, the steam can be exhausted through weight 70 to an outside.

After the rice cooking process has completed, when the user of electric steam pressure rice cooker 10 rotates handle 58 in the count-clockwise direction, locking protrusion 63 is released from locking groove 60. Then, rotating plate 54 rotates in a predetermined direction so that locking member 52 of rotating plate 54 is released from flange 24 of cylindrical inner frame 20. As a result, the opening of cylindrical inner frame 20, which had been covered by cover 56, is opened therefrom.

At the same time, because a part of the high temperature and high pressure steam which is generated inside cylindrical inner frame 20 has not been exhausted to the outside, the part of the high temperature and high pressure steam can suddenly be emitted through the opening of cylindrical inner frame 20 thereto as soon as the opening of cylindrical inner frame 20 covered by cover 56 is opened. Therefore, the user of electric steam pressure rice cooker 10 might get burnt by the high temperature and high pressure steam.

U.S. Pat. No. 4,899,782 issued to Jeurgen Krejza, Kuchen et al. on Feb. 13, 1990, discloses a steam pressure cooker with an improved pressure relief valve capable of securely exhausting a high temperature and high pressure steam generated inside a pressure steam rice cooker. In the steam pressure cooker of Jeurgen Krejza, Kuchen et al., there is no longer any necessity of disassembling and re-assembling the pressure relief valve for the purpose of cleaning. In addition, a structure of the pressure relief valve is enhanced so that a user of the electric steam pressure rice cooker can easily approach and clean the pressure relief valve. Thus, the danger that the user of electric steam pressure rice cooker can get burnt during the cleaning of the relief valve is removed. However, in the steam pressure cooker of Jeurgen Krejza, Kuchen et al., since an additional arrangement for exhausting a steam pressure remaining inside the steam pressure rice cooker immediately after cooking a rice is not provided, it fails to solve the conventional problem as described above.

SUMMARY OF THE INVENTION

The present invention is contrived to solve the foregoing problems. It is an object of the present invention to provide a steam pressure rice cooker with an auxiliary steam pressure exhausting device capable of completely exhausting a high temperature and high pressure steam remaining inside the steam pressure rice cooker to an outside after cooking a rice.

In order to achieve the above object, the present invention provides a steam pressure rice cooker comprising.

a first container from containing a desired quantity of water and rice to be cooked;

a second container for enclosing and supporting the first container;

a lid for opening a shutting an upper portion of the first container, the lid including a cover for tightly shutting the upper portion of the first container, a rotating plate for automatically opening or shutting the cover by receiving a driving force from an outer power source, a handle for generating the driving force sequentially to operate the rotating plate, and a driving force transmitting means for transmitting the driving force from the handle to the rotating plate;

a heater for heating the first container, the heater being disposed in a space between the first container and the second container;

a heating conductive plate for transmitting a heat which is generated from the heater to the first container, the heat conductive plate being disposed in the space between the first container and the second container;

a temperature sensing sensor for sensing a temperature of the first container;

a weight for exhausting a steam pressure which is generated in the first container during the operation of the steam pressure rice cooker to an outside of the steam pressure rice cooker; and an auxiliary steam pressure exhausting device for completely exhausting a steam pressure which remains within the first container immediately after a cooking of the rice to the outside of the steam pressure rice cooker, the auxiliary steam pressure exhausting device being disposed between the handle and the weight within the lid.

The first container includes a flange extending radially outward from the upper portion of the first container. The rotating plate includes a locking member extending radially inward from a lower portion of the rotating plate. The locking member is tightly engaged with the flange as needed.

The handle is compressibly mounted to an upper portion of the lid. The handle includes a first opening formed through a center of the handle, a cut-portion formed at one side wall of the handle, and a first locking groove formed on an outer surface of a lower end of the handle. The first opening includes a first locking protrusion protruding from an inner periphery of a lower portion of the first opening.

The driving force transmitting means includes a driving gear, a first connecting gear for receiving the driving force from the driving gear, and a second connecting gear for transmitting the driving force from the first connecting gear to the rotating plate. The driving gear is engaged with the lower portion of the handle sequentially to receive the driving force from the handle when the handle descends. The first connecting gear is disposed sequentially to engage the driving gear. The second connecting gear is disposed sequentially to engage with the first connecting gear. The driving gear includes a second locking protrusion protruding from one end of the driving gear. When the handle descends, the second locking protrusion is inserted into the first locking groove.

Preferably, the heat conductive plate is disposed between the heater and an outer surface of the first container.

Preferably, the temperature sensing sensor is mounted on an outer surface of a bottom of the first container.

The weight includes a steam exhausting pipe extending through an interior of the lid into the first container. The weight is pneumatically connected to the first container through the steam exhausting pipe.

The auxiliary steam pressure exhausting device includes an exhaust button, a supporting means for elastically supporting the exhaust button and a lever for forcibly opening the weight by receiving the driving force from the exhaust button. The exhaust button is slideably disposed in the first opening of the handle. The supporting means is disposed in the exhaust button.

The exhaust button includes an upper portion exposed to the outside of the steam pressure rice cooker, an open lower portion, a second locking groove formed on an outer surface of the lower end of the exhaust button, and a pressing member extending from the one side of the exhaust button in the horizontal direction. The second locking groove corresponds to the first locking protrusion protruding from the inner periphery of the lower portion of the first opening.

Preferably, the supporting means comprises a compression spring.

The lever includes a compressible portion, a pivot for rotating the lever by a certain angle, a first extending portion and a rounded second extending portion extending from the pivot. When the exhaust button descends, the compressible portion receives a pressing force from the pressing member of the exhaust button. The pivot is disposed to a middle portion of the lever. The first extending portion extends between the compressible portion and the pivot. The first extending portion is slanted by a certain angle, and the second extending portion tilts the weight during the rotation of the lever. The pivot is fixed to a side wall of the lid. The second extending portion is exposed to the outside of the steam pressure rice cooker through a second opening which is formed through an upper wall of the lid.

As described above, since stream pressure rice cooker according to a preferred embodiment of the present invention includes an auxiliary steam pressure exhausting device capable of opening the weight in order to completely exhaust a steam pressure inside the steam pressure rice cooker, it can exhaust steam pressure which remains within steam pressure rice cooker to the outside of said steam pressure rice cooker after a cooking of the rice. Therefore, the present invention provides users with convenience and safety.

BRIEF DESCRIPTION OF THE DRAWINGS

The above object and other characteristics and advantages of the present invention will become more apparent by describing in detail a preferred embodiment thereof with reference to the attached drawings, in which:

FIG. 3 is an exploded perspective view of an auxiliary steam pressure exhauting device according to the present invention;

DETAILED DESCRIPTION OF THE INVENTION

Hereinafter, the preferred embodiment of the present invention will be explained in more detail with reference to the accompanying drawings.

Figure 1:
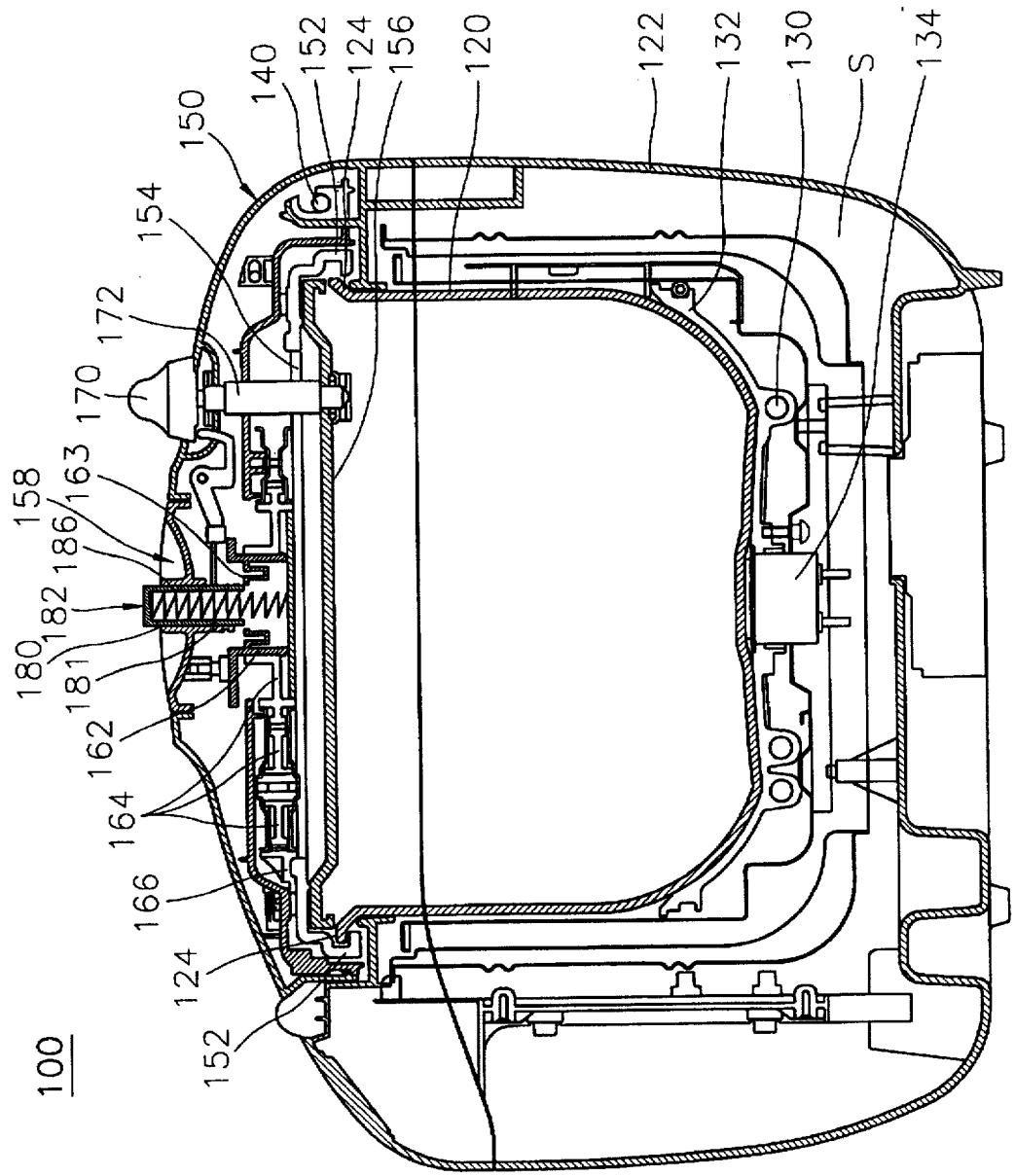
FIG. 1 is a sectional view of an electric stream pressure rice cooker according to a preferred embodiment of the present invention.

FIG. 1 illustrates in detail an internal structure of an electric steam pressure rice cooker 100 according to a preferred embodiment of the present invention.

Electric steam pressure rice cooker 100 mainly includes a cylindrical inner frame 120, a cylindrical outer frame 122, and a lid 150 for opening and closing an opening portion of cylindrical inner frame 120. Cylindrical inner frame 120 contains a desired quantity of water and rice to be cooked. Cylindrical outer frame 122 encloses and supports cylindrical inner frame 120.

A suitable space (S) is formed between an outer surface of a bottom of cylindrical inner frame 120 and outer frame 122. An electric heater 130 for heating cylindrical inner frame 120 is located in the space (S). Electric heater 130 is installed in a gap at suitable distances from cylindrical inner frame 120 and cylindrical outer frame 122. A plurality of heat conductive plates 132 are disposed around electric heater 130. Heat conductive plates 132 are tightly mounted on an outer surface of cylindrical inner frame 120. Heat conductive plates 132 transfer a heat generated from electric heater 130 to cylindrical inner frame 120. A temperature sensor 134 is mounted at a central outer surface of a bottom of cylindrical inner frame 120.

Figure 2:
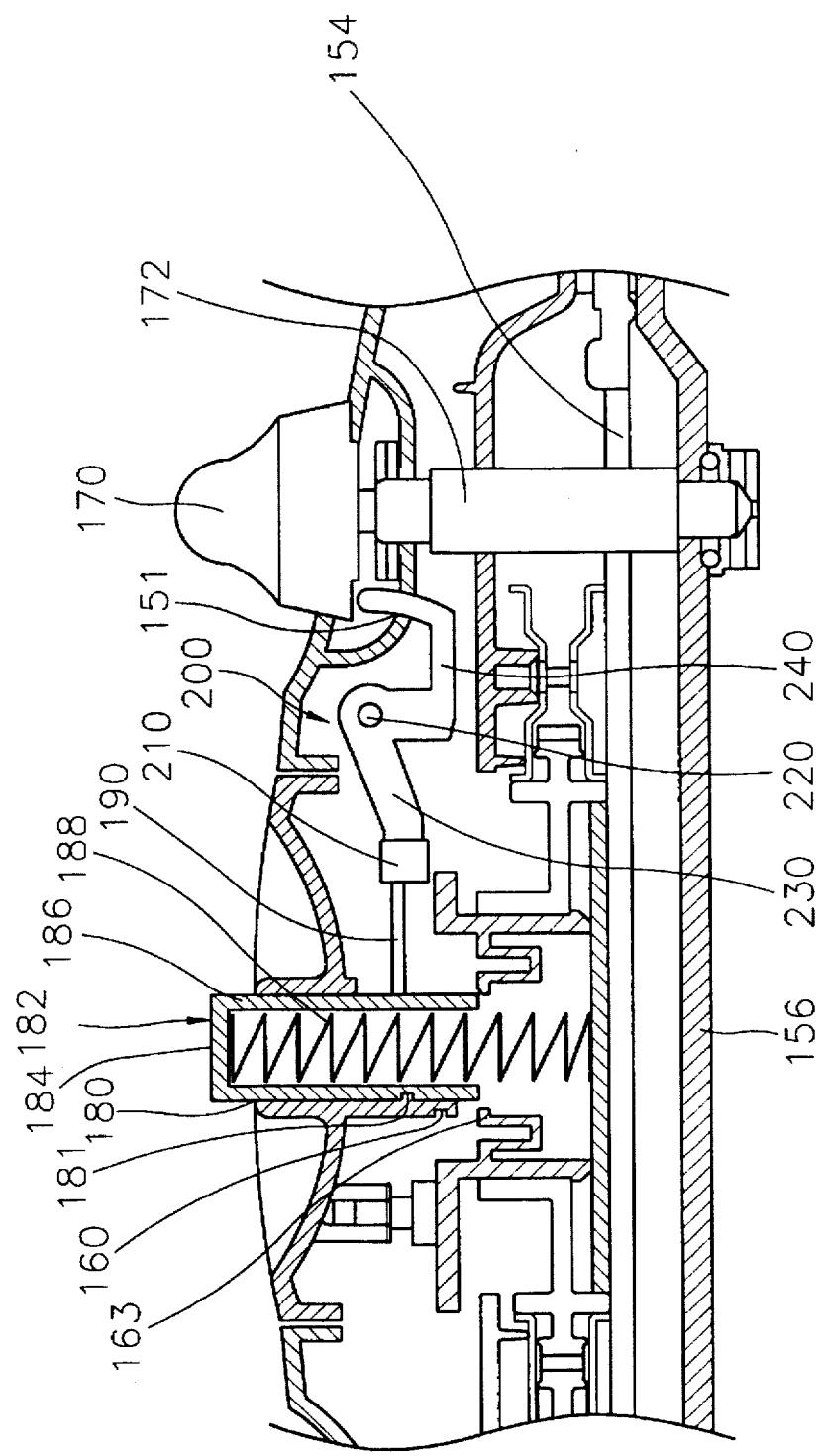
FIG. 2 is a partially enlarged view of FIG. 1.

On the other hand, a lid 150 for opening and shutting an opening of cylindrical inner frame 120 is rotatably mounted on an upper portion of cylindrical inner frame 120 by a hinge member 140. FIG. 2 illustrates an internal structure of lid 150 in detail. Referring to FIG. 2, a rotating plane 154 with a plurality of locking members 152 is provided at an inner side of a bottom of lid 150. A locking member 152 is tightly engaged with a flange 124 extending radially outward from an upper end of cylindrical inner frame 120. A cover 156 for covering an opening of cylindrical inner frame 120 from a bottom side of rotating plate 154. Rotating plate 154 automatically opens or shuts cover 156 by receiving a driving force from an outer power source.

A handle 158 for generating a driving force sequentially to operate rotating plate 154 is compressibly mounted at a center of an upper portion of lid 150. Handle 158 has a first opening 180 formed through a center of handle 158. A first locking protrusion 181 protrudes from a lower side of an inner periphery of first opening 180. A first locking groove 160 is formed on an outer surface of a lower portion of handle 158.

A driving gear 162, a plurality of first connecting gears 164 and second connecting gears 166 are successively disposed in an inner side of lid 150. Driving gear 162 includes a second locking protrusion 163 which is formed at an end of driving gear 161. Second locking protrusion 163 corresponds with first locking groove 160. A second locking protrusion 163 is inserted in first locking groove 160 when handle 158 descends. Driving gear 162, first connecting gears 164 and second connecting gears 166 are sequentially engaged with one another. Handle 158 can be mechanically connected to rotating plate 154 through driving gear 162, first connecting gears 164, and second connecting gears 166.

A weight 170 is mounted at a side of an upper portion of lid 150. An exhaust pipe 172 vertically extends between weight 170 and cylindrical inner frame 120. Weight 170 is mechanically connected to with cylindrical inner frame 120 through exhaust pipe 172. Weight 170 exhausts a high temperature and high pressure steam generated inside cylindrical inner frame 120 to an outside of electric steam pressure rice cooker 100 during an operation of electric steam pressure rice cooker 100.

On the other hand, FIG. 3 illustrates in detail an auxiliary steam pressure exhausting device according to the present invention. The auxiliary steam pressure exhausting is disposed between handle 158 and weight 170 in an inside of lid 150. Referring to FIG. 3, an exhaust button 182 is slideably disposed in a first opening 180 which is formed through a center of handle 158. Exhaust button 182 has a second locking groove 183 formed on an outer surface of a lower end of exhaust button 182, a flat upper portion 184 exposed to the outside of electric steam pressure rice cooker 100, a button body 186 including an open lower portion, a compressing spring 188 disposed inside button body 186, and a pressing member 190 extending from the one side of button 186 in the horizontal direction.

Second locking groove 183 corresponds to first locking protrusion 181 (referred to FIG. 2) protruding from the inner periphery of first opening 180. When exhaust button 182 is mounted in first opening 180, first locking protrusion 181 is inserted into second locking groove 183. Compressing spring 188 elastically supports button body 186. When exhaust button 182 is mounted inside first opening 180, pressing member 190 can slide in the upward and downwards along a cut portion 185 which is formed at one side of handle 185. A free end of pressing member 190 makes contact with one end of lever 200 which is disposed in an inner space of lever 200.

A compressible portion 210 is formed at one end of lever 200. Compressible portion 210 makes contact with pressing member 190 when exhausting button 182 descends by a rotation of handle 158. A pivot 220 for rotating lever 200 in a certain angle is disposed to a middle portion of lever 200. Pivot 200 is fixed on a side wall of lid 150. First extending portion 230 extends between compressible portion 210 and pivot 220. First extending portion 230 slants in a certain angle. Second extending portion 240 extends from pivot 220 in the backward direction. Second extending portion 240 tilts weight 170 during the rotation of lever 200. A free end of second extending portion 240 is exposed to the outside through a second opening 151 which is formed through an upper wall of lid 150.

Hereinafter, an operation of conventional electric steam pressure rice cooker 100 according to one embodiment of the present invention constructed as above will be described.

Hereinafter, an operation of conventional electric steam pressure rice cooker 100 according to one embodiment of the present invention constructed as above will be described.

When a user of electric steam pressure rice cooker 100 wants to boil a rice, the user places rice to be cooked and a desired quantity of water into cylindrical inner frame 120. Thereafter, the user closes an opening of cylindrical inner frame 120 by the shutting of lid 150. Under this state, when the user presses down and rotates handle 158 in the clockwise direction, first locking protrusion 181 of first opening 180 is released from second locking groove 183 of exhaust button 182. As a result, handle 158 gradually descends. When handle 158 descends, second locking protrusion 163 of driving gear 162 is thus inserted into first locking groove 160 of handle 158. Thereby, driving gear 162 can rotate. Then, first connecting gears 164 and second connecting gear 166 are rotated and the rotation thereof controls a rotation of rotating plate 154. When rotating plate 154 is rotated, locking member 152 of rotating plate 154 is tightly engaged with flange 124 of cylindrical inner frame 120. Thereby, cover 156 of lid 150 tightly closes the opening of cylindrical inner frame 120.

Figure 4A:
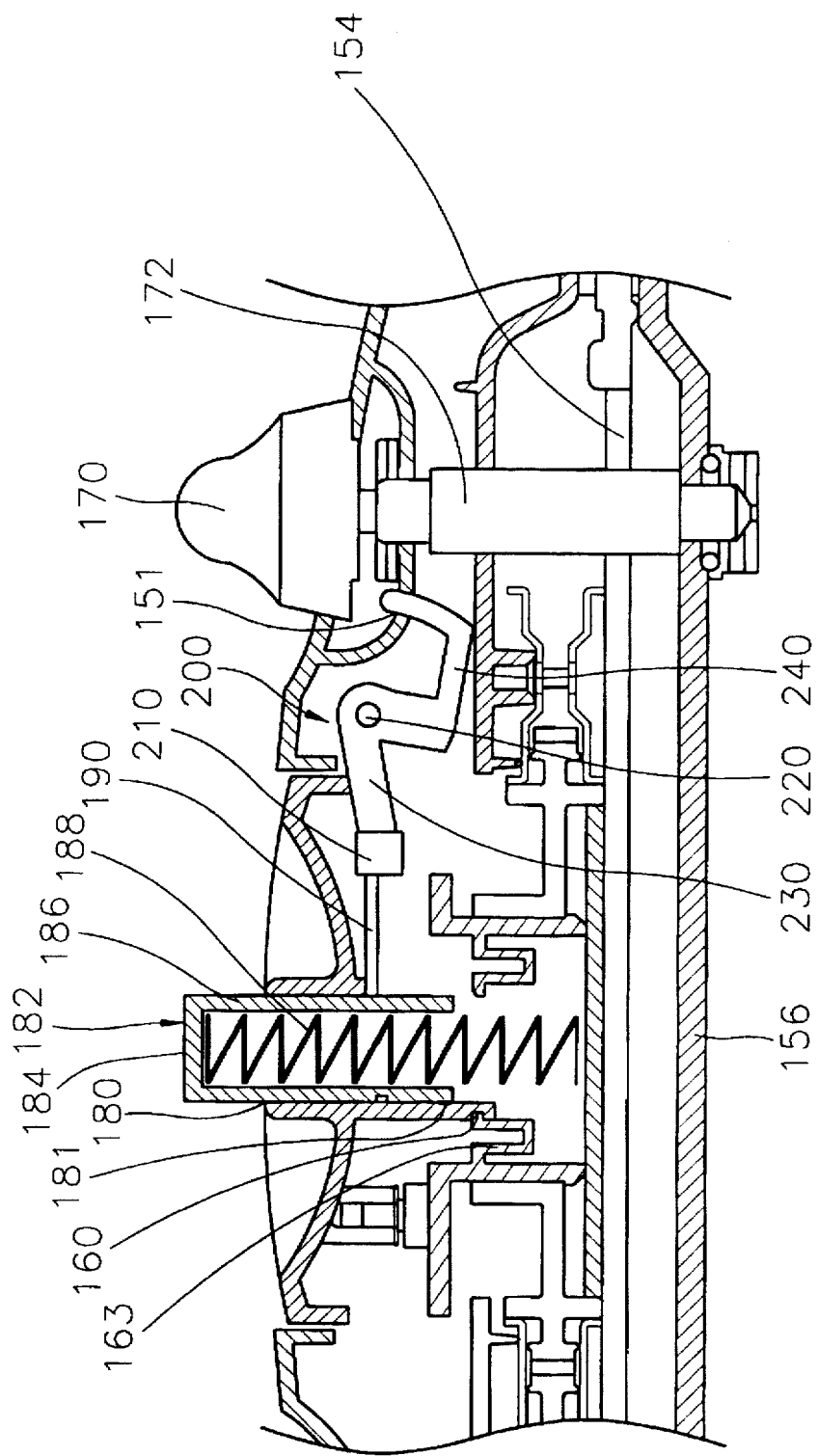
FIG. 4A illustrates a rotated state of a handle of the steam pressure rice cooker illustrated in FIG. 1.

At this time, as shown in FIG. 4A, exhaust button 182 disposed in a first opening 180 of handle 158 protrudes to an outside of electric pressure steam rice cooker 100 by an elastic force of compressing spring 188. At the same time, pressing member 190 which had pressed compressible portion 210 of lever 200 also ascends. As a result, second extending portion 240 of lever 200 descends by a seesaw motion as first extending portion 230 of lever 200 ascends. Thereby, the free end of second extending portion 240 descends through a second opening 151 which is formed through an upper wall of lid 150, and is spaced from weight 170.

When the user of electric steam pressure rice cooker 100 operates electric steam pressure rice cooker 100 under the state that the user completely rotates handle 158 in the clockwise direction to perfectly close cover 156, electric heater 130 begins to operate and heats cylindrical inner frame 120. At this time, electric heater 130 begins to operate and heats cylindrical inner frame 120. At this time, a high temperature heat generated from electric heater 130 is uniformly transferred to an outer surface of cylindrical inner frame the other hand, if a steam generated inside cylindrical inner frame 120 has a steam pressure valve grater than a predetermined steam pressure value during the rice cooking process, the steam can be exhausted through a weight 170 to an outside.

Figure 4B:
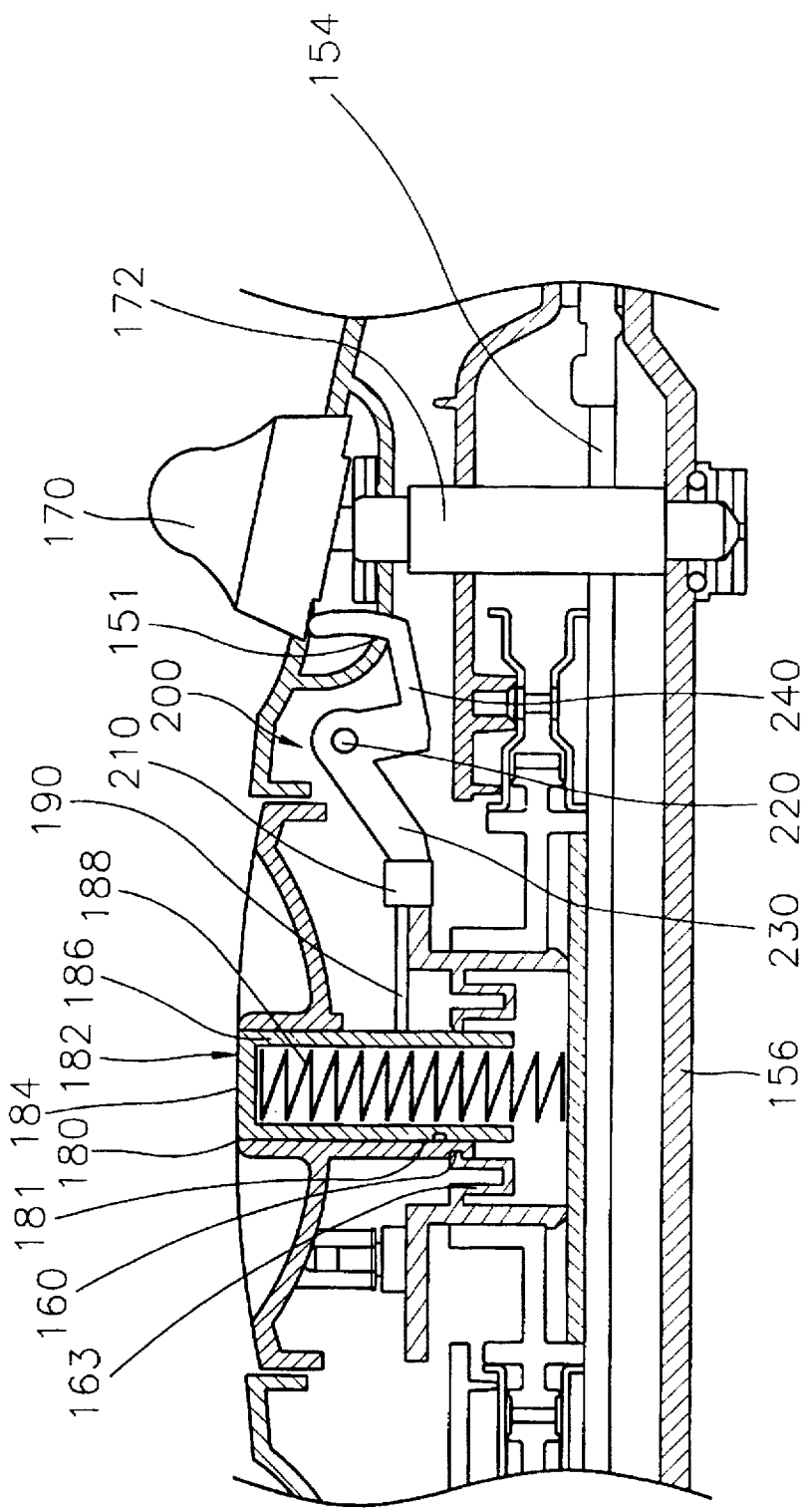
FIG. 4B illustrates a pressed state of an exhaust button of the steam pressure rice cooker illustrated in FIG. 1.
Figure 5:
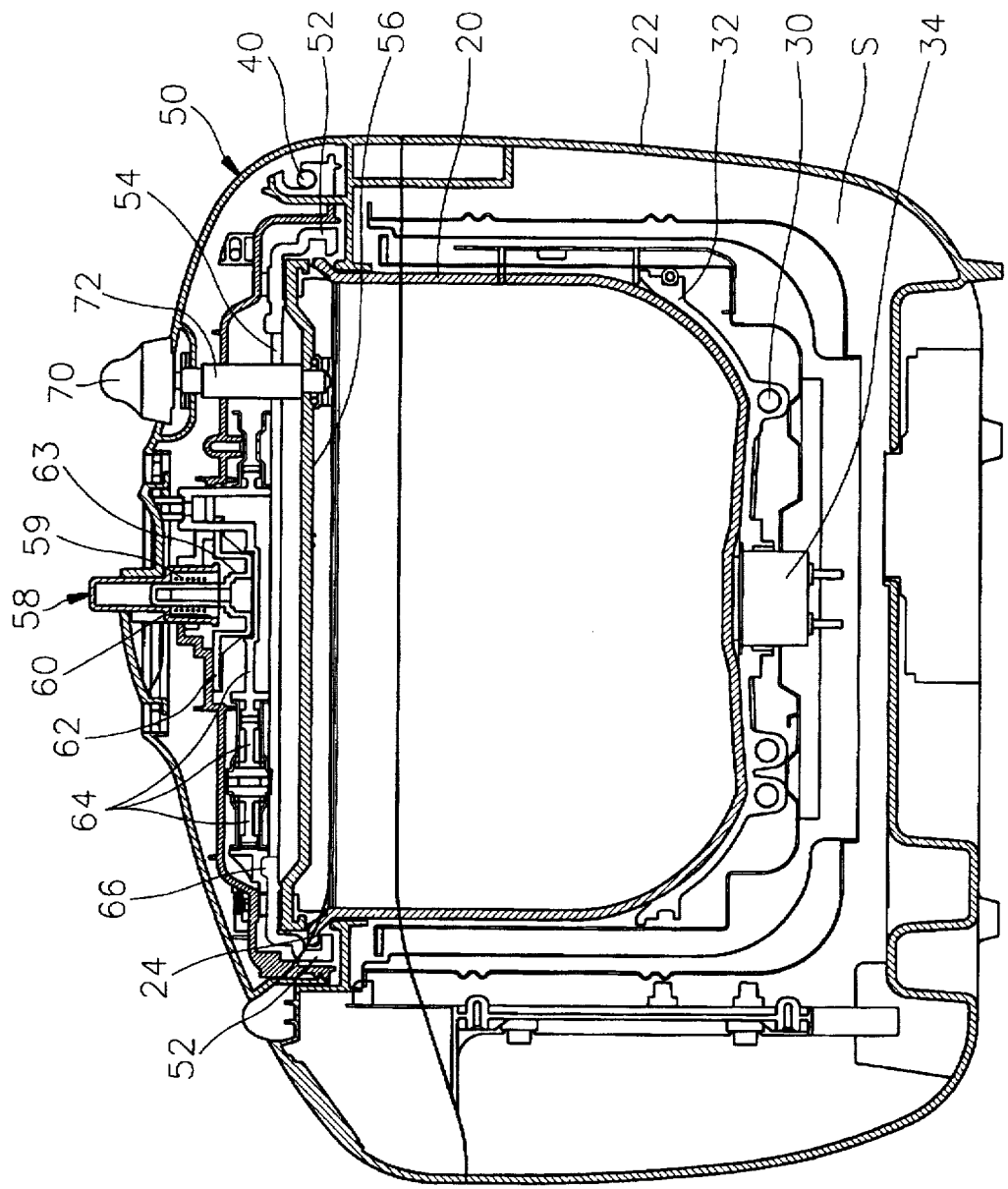
FIG. 5 is a sectional view of an electric steam pressure rice cooker according to a prior art.
Figure 6:
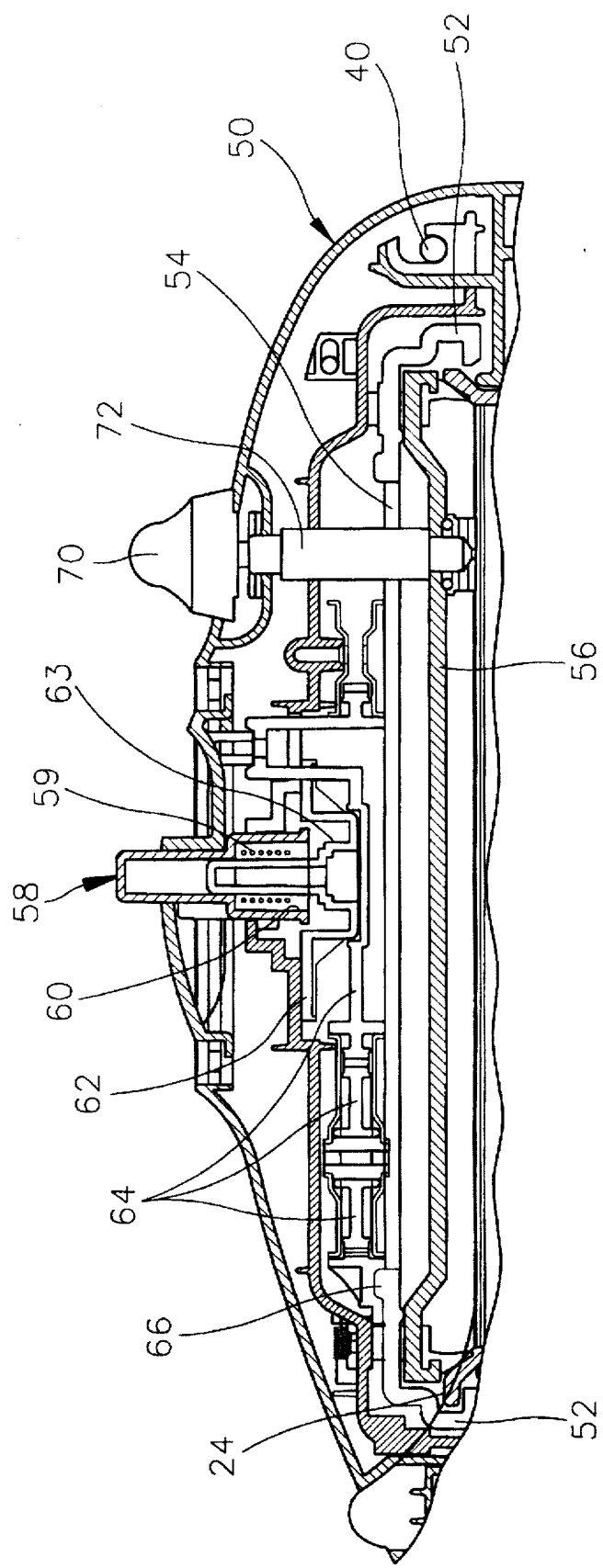
FIG. 6 is a partially enlarged view of FIG. 5.

After the rice cooking process has completed, when the user of electric steam pressure rice cooker 100 pushes down upper portion 184 of exhaust button 182 which is exposed to the outside of electric steam pressure rice cooker 100, exhaust button 182 descends so that pressing member 190 of exhaust button 182 presses compressible portion 210 of lever 200. Then, lever 200 seesaws centering around pivot 220. That is, lever 200 rotates centering around pivot 220. As a result, the free end of second extending portion 240 of lever 200 ascends and tilts weight 170 in a certain angle, as shown in FIG. 4B. Therefore, weight 170 is forcibly opened so that a high temperature and high pressure steam which remains inside cylindrical inner frame 120 is completely exhausted to an outside.

In this state, when the user of electric steam pressure rice cooker 100 rotates handle 158 in the count-clockwise direction, second locking protrusion 163 is released from first locking groove 160. Then, rotating plate 154 rotates locking member 152 of rotating plate 154 in the direction of separation from flange 124 of cylindrical inner frame 120. Accordingly, the opening of cylindrical inner frame 120 which had been covered by cover 156 is opened therefrom.

Therefore, the user of electric steam pressure rice cooker 100 can safely open lid 150 of electric steam pressure rice cooker 100 under the state that the high temperature and high pressure steam has been completely removed from cylindrical inner frame 120.

As described above, since electric steam pressure rice cooker 100 according to a preferred embodiment of the present invention includes an auxiliary steam pressure exhausting device capable of forcibly opening weight 170 for completely exhausting a steam pressure inside electric steam pressure rice cooker 100, it can exhaust the steam pressure which remains within electric steam pressure rice cooker 100 to the outside of electric steam pressure rice cooker 100 immediately after a cooking of the rice. Therefore, the present invention provides the user of electric steam pressure rice cooker 100 with convenience and safety.

While the present invention has been particularly shown and described with reference to a particular embodiment thereof, it will be understood by those skilled in the art that various changes in form and detail may be understood by those skilled in the art that various changes in form and detail may be effected therein without departing from the spirit and scope of the invention as defined by the appended claims.

What is claimed is:

1. A steam pressure rice cooker comprising:
   a first container for containing a desired quantity of water and rice to be cooked;
   a second container for enclosing and supporting said first container;
   a lid for opening or shutting an upper portion of said first container, said lid including a cover for tightly shutting the upper portion of said first container, a rotating plate for automatically opening or shutting said cover by receiving a driving force from an outer power source, a handle for generating the driving force sequentially to operate said rotating plate, and a driving force transmitting means for transmitting the driving force from said handle to said rotating plate;
   a heater for heating said first container, said heater being disposed in a space between said first container and said second container;
   a temperature sensing sensor for sensing a temperature of said first container;
   a weight for exhausting a steam pressure which is generated in said first container during the operation of said steam pressure rice cooker to an outside of said steam pressure rice cooker, and
   an auxiliary steam pressure exhausting device for completely exhausting a steam pressure which remains within said first container immediately after cooking of the rice to the outside of said steam pressure rice cooker, said auxiliary steam pressure exhausting device being disposed between said handle and said weight within said lid.

2. A steam pressure rice cooker as claimed in claim 1, wherein said first container includes a flange extending radially outward from the upper portion of said first container, said rotating plate includes a locking member extending radially inward from a lower portion of said rotating plate, said locking member being tightly engaged with said flange as needed.

3. A steam pressure rice cooker as claimed in claim 1, wherein said handle is compressibly mounted to an upper portion of said lid, said handle includes a first opening formed through a center of said handle, a cut-portion formed at one side wall of said handle, and a first locking groove formed on an outer surface of a lower end of said handle, said first opening including a first locking protrusion protruding from an inner periphery of a lower portion of said first opening.

4. A steam pressure rice cooker as claimed in claim 1, wherein said driving force transmitting means includes a driving gear, a first connecting gear for receiving the driving force from said driving gear, and a second connecting gear for transmitting the driving force from said first connecting gear to said rotating plate, said driving gear being engaged with the lower portion of said handle sequentially to receive the driving force from said handle when said handle descends, said first connecting gear being disposed sequentially to engage with said driving gear and said second connecting gear being disposed sequentially to engage with said first connecting gear.

5. A steam pressure rice cooker as claimed in claim 4, wherein said driving gear includes a second locking protrusion protruding from one end of said driving gear, said second locking protrusion being inserted into said first locking groove when said handle descends.

6. A steam pressure rice cooker as claimed in claim 1, wherein said heat conductive plate is disposed between said heater and an outer surface of said first container.

7. A steam pressure rice cooker as claimed in claim 1, wherein said temperature sensing sensor is mounted to an outer surface of a bottom of said first container.

8. A steam pressure rice cooker as claimed in claim 1, wherein said weight includes a steam exhausting pipe extending through an interior of said lid into said first container, and said weight is pneumatically connected to said first container through said steam exhausting pipe.

9. A steam pressure rice cooker as claimed in claim 1, wherein said auxiliary steam pressure exhausting device includes an exhaust button, a supporting means for elastically supporting said exhaust button, and a lever for forcibly opening said weight by receiving the driving force from said exhaust button, said exhaust button being slideably disposed in said first opening of said handle, said supporting means being disposed in said exhaust button.

10. A steam pressure rice cooker as claimed in claim 9, wherein said exhaust button includes an upper portion being exposed to the outside of said steam pressure rice cooker, an open lower portion, a second locking groove formed on an outer surface of a lower end of said exhaust button, and a pressing member extending from the one side of said exhaust button in the horizontal direction, said second locking groove corresponding to said first locking protrusion protruding from the inner periphery of the lower portion of said first opening.

11. A steam pressure rice cooker as claimed in claim 9, wherein said supporting means comprises a compression spring.

12. A steam pressure rice cooker as claimed in claim 9, wherein said lever includes a compressible portion, a pivot for rotating said lever by a certain angle, a first extending portion, and a rounded second extending portion extending from said pivot, said compressible portion receiving a pressing force from said pressing member of said exhaust button when said exhaust button descends, said pivot being disposed to a middle portion of said lever, said first extending portion extending between said compressible portion of said pivot, said first extending portion being slanted in a certain angle, and said second extending portion tilting said weight during the rotation of said lever.

13. A steam pressure rice cooker as claimed in claim 12, wherein said pivot is fixed to a side wall of said lid.

14. A steam pressure rice cooker as claimed in claim 12, wherein said second extending portion is exposed to the outside of the steam pressure rice cooker through a second opening which is formed through an upper wall of said lid.

15. A steam pressure rice cooker comprising:

(a) a first container for containing a desired quantity of water and rice to be cooked, said first container including a flange extending radially outward from the upper portion of said first container.

(b) a second container for enclosing and supporting said first container;

(c) a lid for opening or shutting an upper portion of said first container, said lid including a cover for tightly shutting the upper portion of said first container, a rotating plate for automatically opening or shutting said cover by receiving a driving force from an outer power source, a handle for generating the driving force sequentially to operate said rotating plate, and a driving force transmitting means for transmitting the driving force from said handle to said rotating plate, said rotating plate including a locking member extending radially outward from a lower portion of said rotating plate, said locking member being tightly engaged with said flange as needed, said handle being compressibly mounted to an upper portion of said lid, said handle including a first opening formed through a center of said handle, a cut-portion formed at one side wall of said handle, and a first locking groove formed on an outer surface of a lower end of said handle, said first opening including a first locking protrusion protruding from an inner periphery of a lower portion of said first opening;

(d) a heater for heating said first container, said heater being disposed in a space between said first container and said second container;

(e) a heat conductive plate for transmitting a heat which is generated from said heater to said first container, said heat conductive plate being disposed between said heater and an outer surface of said first container in the space between said first container and said second container;

(f) a temperature sensing sensor for sensing a temperature of said first container, said temperature sensing sensor being mounted to an outer surface of a bottom of said first container;

(g) a weight for exhausting a steam pressure which is generated in said first container during the operation of said steam pressure rice cooker to an outside of said steam pressure rice cooker, said weight including a steam exhausting pipe extending through an interior of said lid into said first container, and said weight being pneumatically connected to said first container through said steam exhausting pipe; and (h) an auxiliary steam pressure exhausting device for completely exhausting a steam pressure which remains within said first container immediately after a cooking of rice to the outside of said steam pressure rice cooker, said auxiliary steam pressure exhausting being disposed between said handle and said weight within said lid, said auxiliary steam pressure exhausting device including an exhaust button, a supporting means for elastically supporting said exhaust button, and a lever for forcibly opening said weight by receiving the driving force front said exhaust button, said exhaust button being slideably disposed in said first opening of said handle, said supporting means being disposed in said exhaust button.

16. A steam pressure rice cooker as claimed in claim 15, wherein said driving force transmitting means includes a driving gear, a first connecting gear for receiving the driving force from said driving gear, and a second connecting gear for transmitting the driving force from said first connecting gear to said rotating plate, said driving gear including a second locking protrusion protruding from one end of said driving gear, said second locking protrusion being inserted into said first locking groove sequentially to receive the driving force from said handle when said handle descends, said first connecting gear being disposed sequentially to engage with said driving gear, and said second connecting gear being disposed sequentially to engage with said first connecting gear.

17. A steam pressure rice cooker as claimed in claim 15, wherein said exhaust button includes an upper portion being exposed to the outside of said steam pressure rice cooker, an open lower portion, a second locking groove formed on an outer surface of a lower end of said exhaust button, and a pressing member extending from the one side of said exhaust button in the horizontal direction, said second locking groove corresponding to said first locking protrusion protruding from the inner periphery of the lower portion of said first opening.

18. A steam pressure rice cooker as claimed in claim 15, wherein said supporting means comprises a compression spring.

19. A steam pressure rice cooker as claimed in claim 15, wherein said lever includes a compressible portion, a pivot for rotating said lever by a certain angle, a first extending portion, and a rounded second extending portion extending from said pivot said compressible portion receiving a pressing force from said pressing member of said exhaust button when said exhaust button descends, said pivot being disposed to a middle portion of said lever and being fixed to a side wall of said lid, said first extending portion extending between said compressible portion and said pivot, said first extending portion being slanted in a certain angle, and said second extending portion tilting said weight during the rotation of said lever.

20. A steam pressure rice cooker as claimed in claim 19, wherein said second extending portion is exposed to the outside of the steam pressure rice cooker through a second opening which is formed through an upper wall of said lid.

* * * * *